US008583463B1

(12) United States Patent
Kalinowski et al.

(10) Patent No.: US 8,583,463 B1
(45) Date of Patent: Nov. 12, 2013

(54) AIRCRAFT FUEL CONSERVATION SYSTEM

(75) Inventors: Robert D. Kalinowski, Saint Charles, MO (US); Shankar Sundaram, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 13/279,821

(22) Filed: Oct. 24, 2011

(51) Int. Cl.
*G06F 19/00* (2011.01)

(52) U.S. Cl.
USPC ............................ 705/7.11; 705/7.13; 705/28

(58) Field of Classification Search
USPC ................ 701/3, 29.3, 29.5, 30, 33, 35, 123; 705/7.13, 7.11, 28
See application file for complete search history.

(56) References Cited

U.S. PATENT DOCUMENTS

| | | | | |
|---|---|---|---|---|
| 2004/0143377 | A1* | 7/2004 | Sudou | 701/30 |
| 2009/0005927 | A1* | 1/2009 | Schlatre et al. | 701/30 |
| 2010/0063650 | A1 | 3/2010 | Vian et al. | |
| 2010/0152927 | A1* | 6/2010 | Sacle et al. | 701/3 |
| 2010/0211358 | A1 | 8/2010 | Kesler et al. | |
| 2011/0093306 | A1* | 4/2011 | Nielsen et al. | 705/7.13 |

* cited by examiner

*Primary Examiner* — Thomas Dixon
*Assistant Examiner* — Gerald Vizvary
(74) *Attorney, Agent, or Firm* — Yee & Associates, P.C.

(57) ABSTRACT

A method and apparatus for managing fuel consumption for vehicles. A set of inconsistencies is identified on a number of vehicles in a plurality of vehicles. The set of inconsistencies has an effect on the fuel consumption by the number of vehicles. A predicted fuel consumption is identified for the number of vehicles based on the set of inconsistencies. A determination is made as whether to perform rework on the set of inconsistencies on the number of vehicles based on the predicted fuel consumption for the number of vehicles.

22 Claims, 6 Drawing Sheets

AIRCRAFT FUEL CONSERVATION SYSTEM

BACKGROUND INFORMATION

1. Field

The present disclosure relates generally to fuel use by vehicles and, in particular, fuel use by aircraft. Still more particularly, the present disclosure relates to a method and apparatus for managing inconsistencies on aircraft to manage fuel use of the vehicles.

2. Background

Aircraft carry passengers, cargo, or both between different locations. For example, an aircraft may fly a route carrying passengers from an origination airport in one city to a destination airport in another city. The profitability of flying such a route is based on the revenues from passengers paying for tickets and the cost to fly the route. For example, the cost of the route may include salaries for crew members, maintenance, airport fees, fuel, and other costs.

One cost that may be controllable is the cost of fuel for an aircraft. The amount of fuel that an aircraft consumes is determined based on fuel efficiency relating to the aircraft. For example, the engines and the aerodynamics of the aircraft are factors that contribute to the amount of fuel used by the aircraft.

Using engines that are more fuel efficient may reduce the cost for flying the route. As a result, the profitability of the route may be increased. Fuel efficiency of the engine may be maintained or increased through maintenance. Further, replacements of the engine with more fuel-efficient engines also may increase the fuel efficiency of the aircraft.

Another factor in determining the amount of fuel used by an aircraft is the amount of drag on the aircraft. Drag is a force that opposes the movement of an aircraft through the air.

The drag of an aircraft may be affected by different factors. For example, the smoothness of coats of paint on the skin of the aircraft may affect the amount of drag. Additionally, inconsistencies on the surface of the aircraft also affect the amount of drag. For example, dirt on the exterior of the aircraft also may add weight and increase drag on the aircraft. As another example, a dent in the surface of the aircraft also may increase the drag on the aircraft.

Maintenance may be performed to rework inconsistencies, clean aircraft, and other operations that may increase the fuel efficiency of the aircraft. However, performing this type of maintenance at typically scheduled maintenance times may result in an undesired level of fuel efficiency between maintenance operations. Scheduling additional maintenance results in the aircraft being taken out of service and producing less revenue.

Thus, it would be advantageous to have a method and apparatus that takes into account at least some of the issues discussed above, as well as possibly other issues.

SUMMARY

In one illustrative embodiment, a method for managing fuel consumption for vehicles is provided. A set of inconsistencies is identified on a number of vehicles in a plurality of vehicles. The set of inconsistencies have an effect on the fuel consumption by the number of vehicles. A predicted fuel consumption is identified for the number of vehicles based on the set of inconsistencies. A determination is made as whether to perform rework on the set of inconsistencies on the number of vehicles based on the predicted fuel consumption for the number of vehicles.

In another illustrative embodiment, a method for analyzing fuel consumption for a group of vehicles is provided. A set of inconsistencies is identified on a number of vehicles in the group vehicles. The set of inconsistencies has an effect on the fuel consumption by the number of vehicles. A predicted fuel consumption is identified for the number of vehicles based on the set of inconsistencies and a planned use of the number of vehicles. A predicted cost is identified associated with performing rework on the set of inconsistencies identified for the number of vehicles based on a predicted fuel consumption and the planned use for the number of vehicles.

In yet another illustrative embodiment, a vehicle fuel consumption management system comprises a vehicle database and a fuel consumption manager. The fuel consumption manager is configured to identify a set of inconsistencies on a number of vehicles in a plurality of vehicles. The set of inconsistencies has an effect on a fuel consumption by a vehicle. The fuel consumption manager is further configured to identify a predicted fuel consumption for the number of vehicles based on the set of inconsistencies using the set of inconsistencies identified and the vehicle database. The fuel consumption manager is further configured to determine whether to perform rework on the set of inconsistencies based on the predicted fuel consumption of the vehicle.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

DETAILED DESCRIPTION

The different illustrative embodiments recognize and take into account that calculations of changes in the aerodynamics of an aircraft may be performed based on inconsistencies on the surface of the aircraft. The different illustrative embodiments recognize and take into account that each inconsistency may contribute to the drag on the aircraft. As more inconsistencies occur on the surface of the aircraft, the drag increases.

The different illustrative embodiments recognize and take into account that increased drag increases the amount of fuel used to fly the same distance than without drag. As a result, fuel efficiency may be reduced by inconsistencies on the aircraft.

The different illustrative embodiments provide a method and apparatus for managing fuel consumption of vehicles. A set of inconsistencies is identified on the vehicle in the vehicles. The set of inconsistencies has an effect on the fuel consumption by the vehicle. A predicted fuel consumption is identified based on the inconsistencies. A determination is made as to whether to rework the set of inconsistencies based on the predicted fuel consumption of the vehicle. In reworking the set of inconsistencies, one or more of the inconsistencies may be reworked.

Figure 1:
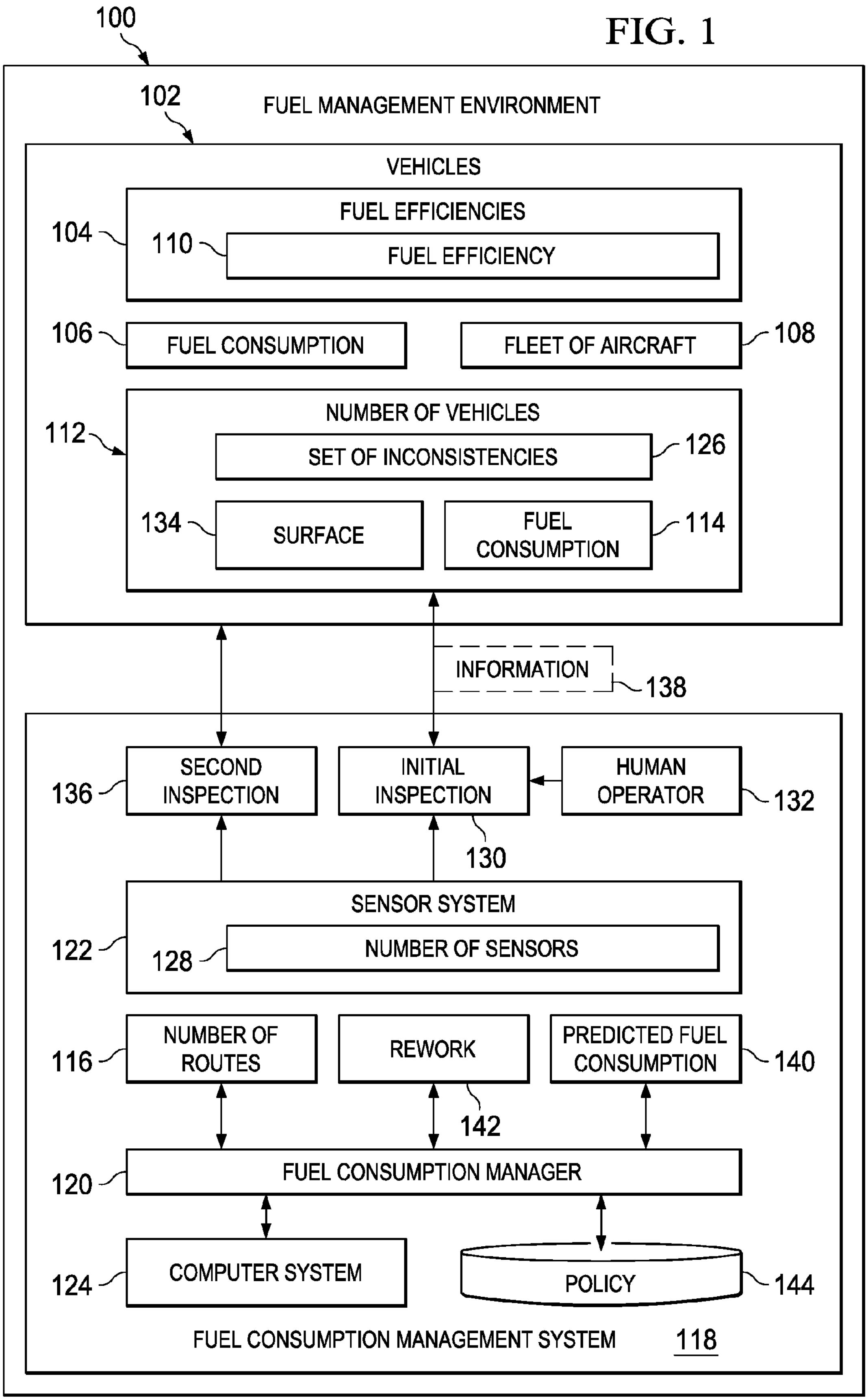
FIG. 1 is an illustration of a block diagram of a fuel management environment in accordance with an illustrative embodiment.

With reference now to the figures and, in particular, with reference to FIG. 1, an illustration of a block diagram for a fuel management environment is depicted in accordance with an illustrative embodiment. As depicted, fuel management environment 100 includes vehicles 102. In this example, vehicles 102 have fuel efficiencies 104. In these illustrative examples, fuel efficiencies 104 are measured by fuel consumption 106 that occurs while operating vehicles 102.

In these illustrative examples, vehicles 102 take the form of fleet of aircraft 108. In these illustrative examples, fuel efficiency 110 in fuel efficiencies 104 for a vehicle in number of vehicles 112 is measured as a ratio of the distance traveled per unit of fuel consumed by the vehicle. As used herein, a "number", when used with reference to items, means one or more items. For example, "number of vehicles 112" is one or more vehicles.

In particular, fuel consumption 114 for number of vehicles 112 may be measured based on number of routes 116 traveled by number of vehicles 112.

Fuel consumption management system 118 is configured to manage fuel consumption 106 for vehicles 102. As depicted, fuel consumption management system 118 comprises fuel consumption manager 120 and sensor system 122.

In these illustrative examples, fuel consumption manager 120 is used to analyze fuel efficiencies 104 for number of vehicles 112. Fuel consumption manager 120 may be implemented using hardware, software, or a combination of the two. In this particular example, fuel consumption manager 120 is implemented using computer system 124. Computer system 124 comprises one or more computers. When more than one computer is present, those computers may be in communication with each other. This communication may be provided through communications links, such as those found in networks.

Sensor system 122 is configured to identify set of inconsistencies 126 on number of vehicles 112. As used herein, a "set", when used with reference to items, means one or more items. For example, "set of inconsistencies 126" is one or more inconsistencies. An inconsistency may be a change in the surface of a vehicle. The inconsistency may affect drag on the vehicle. An inconsistency may be, for example, a dent, a crack, peeling paint, and other inconsistencies that may change the surface of the vehicle.

Sensor system 122 is implemented using hardware and may also include software. In this illustrative example, sensor system 122 may be implemented using number of sensors 128.

In these illustrative examples, number of sensors 128 may take different forms. For example, without limitation, number of sensors 128 may include sensors selected from a visible light camera, an infrared camera, an eddy current sensor, a back scatter x-ray system, a piezoelectric sensor, and other suitable types of sensors. In this illustrative example, set of inconsistencies 126 is identified for number of vehicles 112.

In this illustrative example, set of inconsistencies 126 may be identified in a number of different ways. For example, initial inspection 130 may be performed on number of vehicles 112. Initial inspection 130 may be performed using sensor system 122, human operator 132, or a combination of the two. Initial inspection 130 may identify a presence of set of inconsistencies 126.

Initial inspection 130 may be performed between flights of number of vehicles 112, during refueling, maintenance, and/or other operations. In these illustrative examples, set of inconsistencies 126 is identified on surface 134 of number of vehicles 112. If human operator 132 identifies set of inconsistencies 126, a determination may be made as to whether second inspection 136 should be performed.

For example, if set of inconsistencies 126 is identified during initial inspection 130, a determination may be made as to whether set of inconsistencies 126 includes additional inconsistencies not previously detected. If additional inconsistencies are present, then second inspection 136 may be made.

Another situation in which second inspection 136 may be performed is in response to an inadvertent contact of a vehicle with an aircraft. For example, a food service vehicle may inadvertently contact the surface of an aircraft when performing maneuvers to position itself to load supplies onto the aircraft.

Another example of when second inspection 136 may be made is a situation in which second inspection 136 is part of a scheduled maintenance program. For example, second inspection 136 may be performed on a regular basis as part of a maintenance process.

Second inspection 136 may be an inspection performed to identify information 138 about set of inconsistencies 126. Information 138 is information used to identify predicted fuel consumption 140 for number of vehicles 112. In these illustrative examples, predicted fuel consumption 140 may identify the change in fuel consumption 106 for each inconsistency on a vehicle. Further, predicted fuel consumption 140 also may identify the change in fuel consumption 106 for all inconsistencies on a particular vehicle. Additionally, predicted fuel consumption 140 also may take into account a change in fuel consumption 106 in all vehicles for vehicles 102. Further, predicted fuel consumption 140 also may identify groups of aircraft with respect to fuel efficiency for those vehicles.

With information 138 for set of inconsistencies 126, fuel consumption manager 120 identifies predicted fuel consumption 140 for number of vehicles 112. With predicted fuel consumption 140, fuel consumption manager 120 determines whether to rework set of inconsistencies 126 based on predicted fuel consumption 140. Policy 144 also may be used by fuel consumption manager 120 along with predicted fuel consumption 140 to determine whether rework 142 should be performed. Policy 144 is one or more rules that define when rework 142 should be performed. Furthermore, policy 144 may be used when identifying a selected predicted fuel consumption for the portion of the route using the set of inconsistencies and a predicted fuel consumption database for different distances.

The rules in policy 144 may be based on costs, profitability, logistics, and/or other suitable factors. In these illustrative examples, rework 142 on set of inconsistencies 126 may be rework 142 on a portion or all of the inconsistencies in set of inconsistencies 126.

This process may be performed for number of vehicles 112, where number of vehicles 112 may be a portion or all of vehicles 102. Additionally, determinations of whether to perform rework 142 on number of vehicles 112 in vehicles 102 may be based on fuel consumption 106 for vehicles 102 as a whole and/or other factors using policy 144. In this manner, whether rework 142 is performed on a particular aircraft or multiple vehicles may be based on predicted fuel consumption 140 for vehicles 102 as a whole or for portions of vehicles 102.

In other words, whether rework 142 is performed on a particular vehicle in vehicles 102 may depend on predicted fuel consumption 140 for vehicles 102 rather than predicted fuel consumption 140 for that vehicle. In other words, predicted fuel consumption 140 for the vehicle has an effect on predicted fuel consumption 140 for vehicles 102. Thus, the effect on predicted fuel consumption 140 for vehicles 102 may be used to determine whether to rework inconsistencies on the vehicle with the inconsistencies.

With the use of fuel consumption manager 120, other organizations operating vehicles 102 may reduce fuel consumption 106 and increase fuel efficiencies 104 for vehicles 102. In this manner, costs for operating vehicles 102 may be reduced. Further, a determination may be made as to when rework 142 should be performed. In other words, a presence of additional inconsistencies in set of inconsistencies 126 may not result in rework 142 being performed, depending on predicted fuel consumption 140 and the application of policy 144.

The illustration of fuel management environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the examples in FIG. 1 have been described with respect to vehicles 102 taking the form of fleet of aircraft 108, the different illustrative embodiments may be applied to other types of vehicles. For example, fuel consumption manager 120 may be used with vehicles, such as a surface ship, a spacecraft, a submarine, a train, an automobile, a truck, a ground vehicle, and other suitable types of vehicles in which inconsistencies may affect the consumption of fuel by the vehicle. Further, vehicles 102 may be all of the same type of vehicles or may include different types of vehicles. For example, vehicles 102 may be aircraft. In other examples, vehicles 102 may include aircraft, trucks, and trains.

As another example, additional inspections may be performed in addition to initial inspection 130 and second inspection 136. For example, additional inspections may be performed using different sensor systems and may obtain different types or amounts of information about set of inconsistencies 126.

Figure 2:
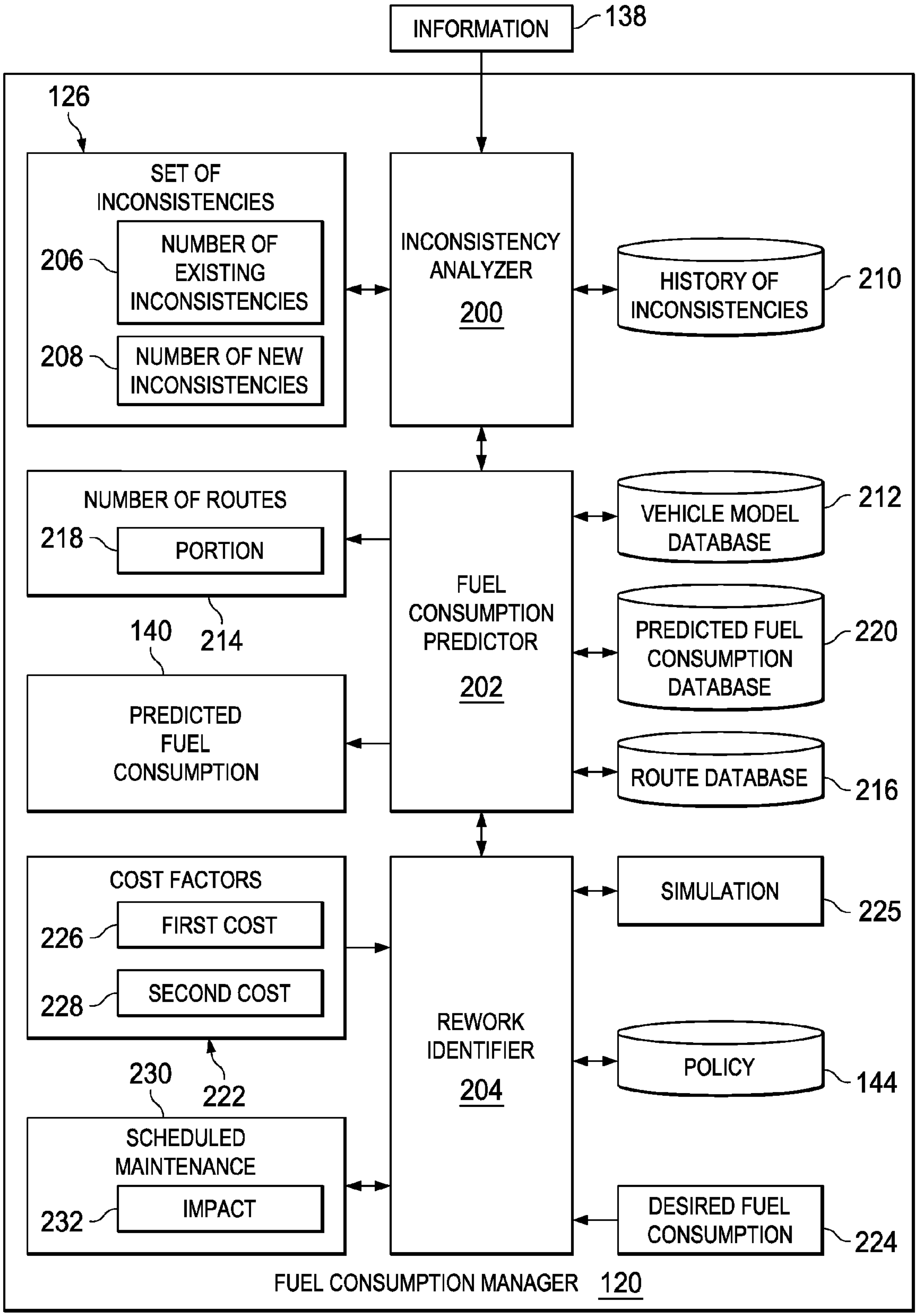
FIG. 2 is an illustration of a block diagram of a fuel consumption manager in accordance with an illustrative embodiment.

Turning now to FIG. 2, an illustration of a block diagram of a fuel consumption manager is depicted in accordance with an illustrative embodiment. In this illustrative example, fuel consumption manager 120 includes inconsistency analyzer 200, fuel consumption predictor 202, and rework identifier 204.

Inconsistency analyzer 200 receives information 138 from sensor system 122 in FIG. 1. Information 138 is for number of vehicles 112 in vehicles 102 in FIG. 1. Information 138 includes information needed to identify drag that may be caused by an inconsistency. For example, information 138 may include images from cameras, data from ultrasonic transducers, and/or other suitable types of information. In one specific example, an image in information 138 may be used to identify inconsistencies that may occur based on whether a part is present or absent. For example, an inconsistency is present when an image shows a missing part, such as a rivet, a fastener, a door, an antenna, or another vehicle part.

With information 138, inconsistency analyzer 200 identifies set of inconsistencies 126 present on number of vehicles 112 from information 138. Inconsistency analyzer 200 may determine whether changes have occurred in set of inconsistencies 126 since the last time number of vehicles 112 was inspected.

The changes may be, for example, a change that has occurred with number of existing inconsistencies 206. In other words, inconsistency analyzer 200 may determine whether an inconsistency has grown, changed shape, or whether some other change has occurred.

Also, the change in set of inconsistencies 126 may be that number of new inconsistencies 208 is present on number of vehicles 112. In these illustrative examples, information 138 is compared to history of inconsistencies 210. History of inconsistencies 210 includes an identification of previously-identified inconsistencies for number of vehicles 112. By comparing history of inconsistencies 210 to information 138, inconsistency analyzer 200 determines whether number of new inconsistencies 208 is present on number of vehicles 112. If changes are present in set of inconsistencies 126 as identified from information 138, history of inconsistencies 210 is updated using information 138.

In these illustrative examples, if changes to number of existing inconsistencies 206, number of new inconsistencies 208, or both are present, an analysis of fuel consumption 114 in FIG. 1 for number of vehicles 112 may be made to determine whether changes have occurred in fuel consumption 114 as a result of number of new inconsistencies 208. This analysis may be performed by fuel consumption predictor 202 in this illustrative example.

As depicted, predicted fuel consumption 140 is identified for number of vehicles 112 using information 138 on set of inconsistencies 126. The identification of predicted fuel consumption 140 is performed using vehicle model database 212 and history of inconsistencies 210. History of inconsistencies 210 identifies inconsistencies present on number of vehicles 112. Vehicle model database 212 is a database containing models of number of vehicles 112.

With history of inconsistencies 210 and vehicle model database 212, predicted fuel consumption 140 may be generated for number of vehicles 112. Additionally, fuel consumption predictor 202 may identify number of routes 214 for number of vehicles 112. With number of routes 214, fuel consumption predictor 202 may identify predicted fuel consumption 140 for number of routes 214 in route database 216.

In the illustrative examples, route database 216 includes information about number of routes 214. This information may include, for example, without limitation, at least one of route data, historical fuel burn, route distance, route turbulence, and other suitable information. The route data identifies the route itself. For example, the route data may be comprised of waypoints. The historical fuel burn is the fuel used for the route. The fuel used may be the actual fuel used by number of vehicles 112.

The historical fuel burn may be identified for different portions. These portions may be, for example, distances between two or more waypoints or other markers. Route distances may include the distance for the entire route as well as different portions of the route. The route turbulence may identify turbulence encountered along the route. This turbulence may be historical or expected turbulence for different times.

Fuel consumption predictor 202 may use predicted fuel consumption database 220 to identify predicted fuel consumption 140 for number of routes 214. Depending on the granularity desired, predicted fuel consumption 140 may be identified for portion 218 in number of routes 214 using predicted fuel consumption database 220. As a result, predicted fuel consumption 140 may be made for different portions of number of routes 214.

Predicted fuel consumption database 220 may contain predicted fuel consumption data for different lengths of travel for different vehicles within number of vehicles 112. The predicted fuel consumption for predicted vehicles may be based on different types of inconsistencies that may be present in set of inconsistencies 126 for number of vehicles 112. Interpolation and other processes may be used to identify predicted fuel consumption 140 for number of vehicles 112 if the length of number of routes 214 or portion 218 does not match the length for which data is present in predicted fuel consumption database 220.

In other illustrative examples, predicted fuel consumption database 220 may include different rates of fuel consumption for different engines that may be present in vehicles. Further, predicted fuel consumption database 220 may include different rates of fuel consumption for different configurations of a vehicle.

With predicted fuel consumption 140, rework identifier 204 may determine whether rework is desired for set of inconsistencies 126. In these illustrative examples, rework identifier 204 may determine whether predicted fuel consumption 140 is greater than desired fuel consumption 224 for number of vehicles 112. If predicted fuel consumption 140 is greater than desired fuel consumption 224, then rework 142 in FIG. 1 for set of inconsistencies 126 may be performed. Desired fuel consumption 224 may be a level of fuel consumption that results in the cost of operating the vehicle with inconsistencies being greater than reworking the inconsistencies on the vehicle. Desired fuel consumption 224 may be on a per vehicle basis, for a group of vehicles in vehicles 102, or for all of vehicles 102.

Of course, additional factors may be taken into account in determining whether or when to perform rework 142. In these illustrative examples, these factors take the form of cost factors 222. A cost factor is a cost with respect to the operation of vehicles 102. This cost may be individual with a particular vehicle in vehicles 102, a portion of vehicles 102, or for all of vehicles 102, depending on the particular implementation. Cost factors 222 may include factors, such as, for example, a cost for a flight, a repair cost, a cost for removing a vehicle from use for rework, a cost for not removing the vehicle from use for rework, and/or other suitable costs.

An analysis may be performed by rework identifier 204 using at least one of predicted fuel consumption 140, desired fuel consumption 224, and cost factors 222. For example, rework identifier 204 may perform simulation 225 in determining whether to perform rework 142. The results of simulation 225 may be used to determine whether to perform rework 142 as well as when rework 142 should be performed. For example, policy 144 may be applied to the results to determine whether to perform rework 142.

For example, simulation 225 may be a Monte Carlo simulation to determine whether rework 142 should be performed. The Monte Carlo simulation may be a discrete simulation model to identify a cost of performing rework 142 at different times and a cost for not performing rework 142 at all.

In one illustrative example, the analysis performed by rework identifier 204 compares first cost 226 for removing number of vehicles 112 from service to second cost 228 of not removing number of vehicles 112 from service. A comparison of first cost 226 to second cost 228 forms a comparison that may be used to determine whether to perform rework 142 of the inconsistencies now or during scheduled maintenance 230. This comparison is an example of a cost trade off analysis. The analysis involves determining whether the extra fuel consumed using aircraft with inconsistencies exceeds the cost for reworking the inconsistencies. In these examples, first cost 226 and second cost 228 may be identified from results of simulation 225.

Policy 144 may include rules as to when rework 142 should be performed based on the comparison of first cost 226 to second cost 228. For example, policy 144 may specify that rework 142 should be performed if first cost 226 is less than second cost 228. In some cases, rework 142 may be performed if first cost 226 is less than or equal to second cost 228. In yet another example, rework 142 may be performed if first cost 226 is greater than second cost 228 by no more than about two percent.

In particular, first cost 226 and second cost 228 also may be compared with respect to whether number of vehicles 112 are removed from service prior to scheduled maintenance 230. Whether rework 142 should be performed may be affected by taking into account when rework 142 is to be performed.

In another illustrative example, predicted fuel consumption 140 may be for all vehicles 102 including impact 232 of set of inconsistencies 126 on predicted fuel consumption 140. In other words, predicted fuel consumption 140 may be overall fuel consumption for vehicles 102. With this example, desired fuel consumption 224 is the desired fuel consumption for vehicles 102 and not just number of vehicles 112.

A determination as to whether rework 142 for set of inconsistencies 126 should be performed may be based on predicted fuel consumption 140 for vehicles 102 as compared to desired fuel consumption 224 for vehicles 102. In this manner, fuel consumption manager 120 may be used to determine whether set of inconsistencies 126 on number of vehicles 112 should be reworked. As a result, the scheduling of a time or the time to perform the rework on inconsistencies in response to a determination to perform the rework on the set of inconsistencies may be based on a comparison, for instance, of a first cost to remove the number of vehicles from service and a second cost of not removing the vehicles from service.

In some illustrative examples, predicted fuel consumption 140 may be identified for vehicles 102 as a whole, including number of vehicles 112. As a result, a determination as to whether rework 142 of set of inconsistencies 126 may be performed based on number of vehicles 112 or on all of vehicles 102. Further, the scheduling of rework 142 may be made by determining the cost of whether to remove number of vehicles 112 from service prior to scheduled maintenance 230.

First cost 226 and second cost 228 may take into account differences in labor rates, material costs, types of rework, particular customers, vehicle owners, and other factors. For example, labor rates may be high at different times of the month or if rework 142 is performed prior to scheduled maintenance 230 instead of during scheduled maintenance 230.

Additionally, first cost 226 may include costs incurred by number of vehicles 112 being absent or not available for service. In other words, when number of vehicles 112 are removed for service, those vehicles are unavailable to generate revenues. By removing number of vehicles 112 prior to scheduled maintenance 230, number of vehicles 112 may be out of service longer than desired. Further, the timing of when rework 142 is performed also may affect the cost.

Of course, other comparisons and analyses may be performed by rework identifier 204 in determining whether and when to perform rework 142. For example, other analyses may take into account weather changes and seasonal changes on the cost for performing rework and maintenance. Further, rework identifier 204 also may take into account revenues that may be expected for different times of the year.

Figure 3:
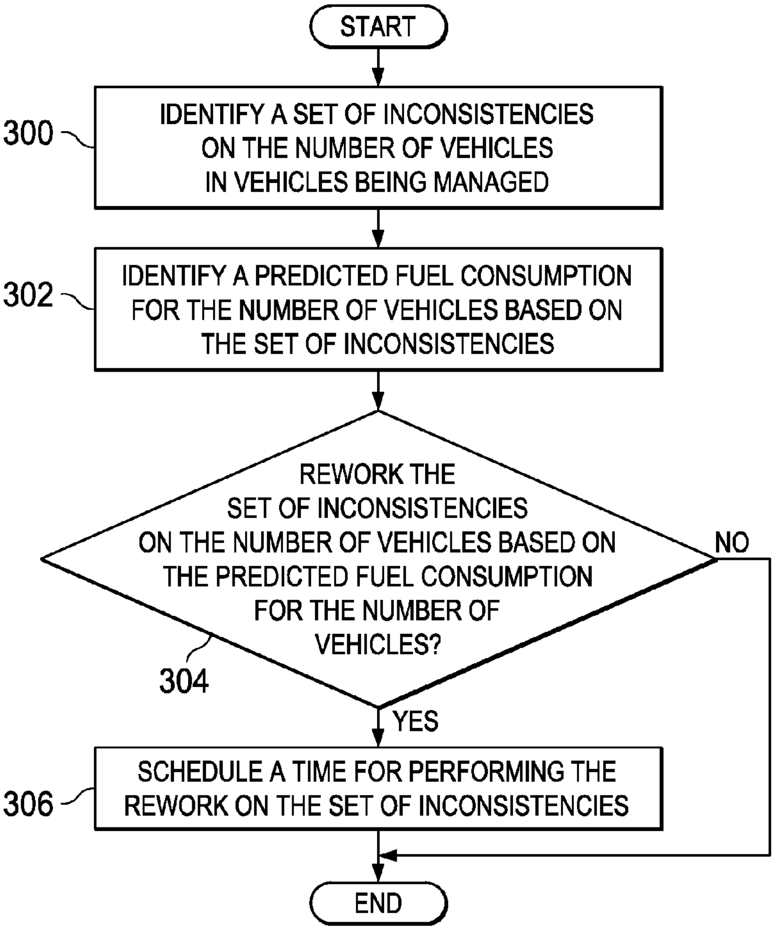
FIG. 3 is an illustration of a flowchart of a process for managing fuel consumption for vehicles in accordance with an illustrative embodiment.

With reference now to FIG. 3, an illustration of a flowchart of a process for managing fuel consumption for vehicles is depicted in accordance with an illustrative embodiment. The process illustrated in FIG. 3 may be implemented in fuel management environment 100 in FIG. 1. In particular, this process may be implemented using fuel consumption manager 120 in FIG. 1.

The process begins by identifying a set of inconsistencies on the number of vehicles in vehicles being managed (operation 300). The set of inconsistencies have an effect on the fuel consumption by the number of vehicles. In particular, the set of inconsistencies may increase the drag on the number of vehicles.

The process identifies a predicted fuel consumption for the number of vehicles based on the set of inconsistencies (operation 302). A determination is then made as to whether to rework the set of inconsistencies on the number of vehicles based on the predicted fuel consumption for the number of vehicles (operation 304). If the set of inconsistencies are to be reworked, the process schedules a time for performing the rework on the set of inconsistencies (operation 306), with the process terminating thereafter. If the set of inconsistencies are not to be reworked, the process also terminates.

Figure 4:
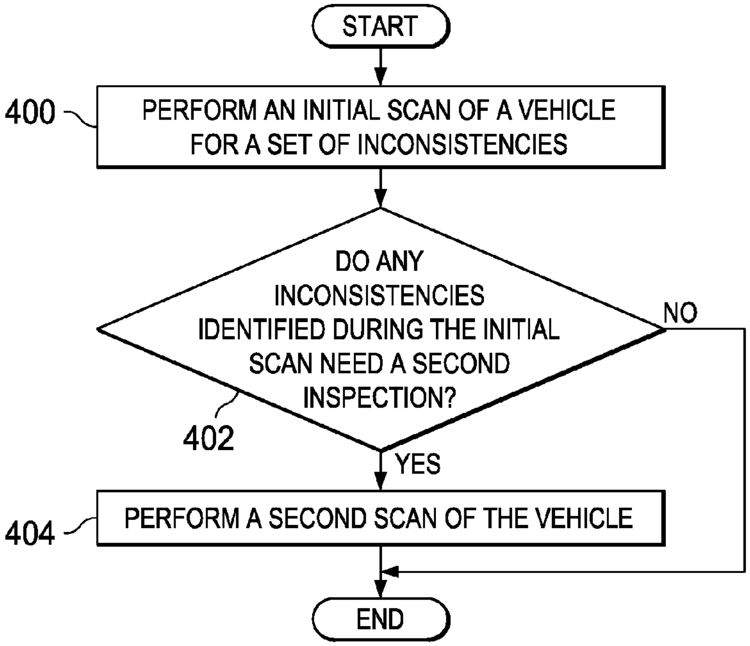
FIG. 4 is an illustration of a flowchart of a process for identifying inconsistencies in accordance with an illustrative embodiment.

Turning next to FIG. 4, an illustration of a flowchart of a process for identifying inconsistencies is depicted in accordance with an illustrative embodiment. The process illustrated in FIG. 4 may be implemented in fuel consumption manager 120 in fuel management environment 100 in FIG. 1. In particular, the process may be implemented in inconsistency analyzer 200 in FIG. 2. This process is also an example of one implementation for operation 300 in FIG. 3.

The process begins by performing an initial scan of a vehicle for a set of inconsistencies (operation 400). The initial scan may be performed by human operators, a sensor system, or a combination of the two. The initial scan may be performed during normally performed activities. These activities may be, for example, refueling, service, maintenance, and other activities. The initial scan may be a visual scan performed by a human operator, a camera in a sensor system, or some combination of the two.

A determination is made as to whether any inconsistencies identified during the initial scan needs a second inspection (operation 402). Whether a second inspection is needed may depend on different factors. The factors may include, for example, a location of the inconsistency, the type of inconsistency, the size of the inconsistency, and/or other suitable factors.

If a second inspection is needed, a second scan of the vehicle is performed (operation 404), with the process terminating thereafter. The second scan is performed to obtain information about the set of inconsistencies. The second scan may include generating multiple types of information. The information may include, for example, at least one of an image of an inconsistency, measurements of the dimensions of the inconsistency, properties of the inconsistency, and other suitable types of information. With reference again to operation 402, if a second inspection is not needed, the process terminates.

Figure 5:
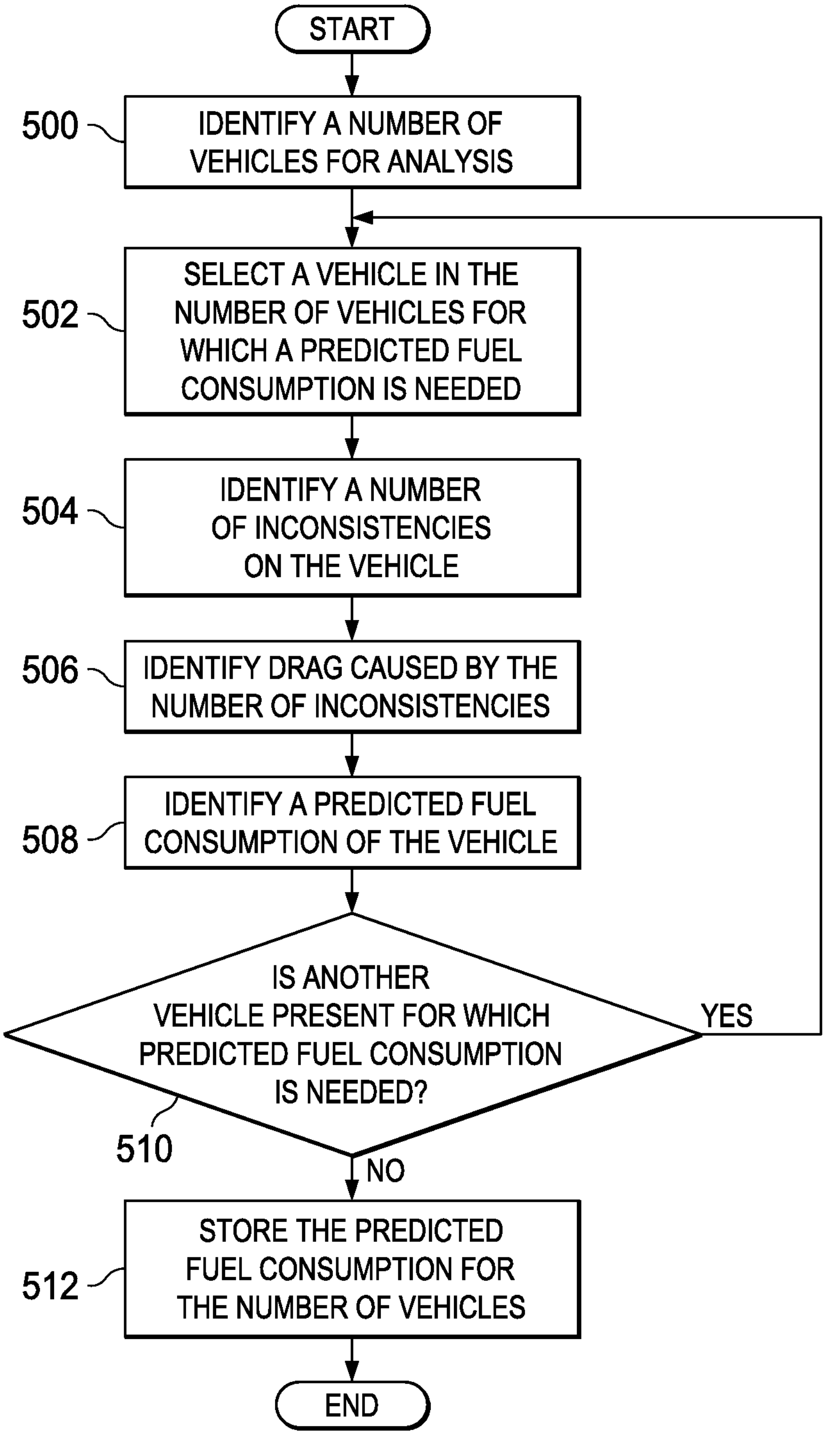
FIG. 5 is an illustration of a flowchart of a process for identifying a predicted fuel consumption for the number of vehicles based on the set of inconsistencies in accordance with an illustrative embodiment.

With reference now to FIG. 5, an illustration of a flowchart of a process for identifying a predicted fuel consumption for the number of vehicles based on the set of inconsistencies is depicted in accordance with an illustrative embodiment. The process illustrated in FIG. 5 may be implemented in fuel consumption manager 120 in fuel management environment 100 in FIG. 1. In particular, the process may be implemented in rework identifier 204 in FIG. 2. This process is also an example of one implementation for operation 302 in FIG. 3.

The process begins by identifying a number of vehicles for analysis (operation 500). A vehicle in the number of vehicles for which a predicted fuel consumption is needed is selected (operation 502). A number of inconsistencies on the vehicle is identified (operation 504). Drag caused by the number of inconsistencies is identified (operation 506). A predicted fuel consumption of the vehicle is identified (operation 508). A determination is then made as to whether another vehicle is present for which predicted fuel consumption is needed (operation 510). If another vehicle is present, the process returns to operation 502. Otherwise, the process stores the predicted fuel consumption for the number of vehicles (operation 512), with the process terminating thereafter.

Figure 6:
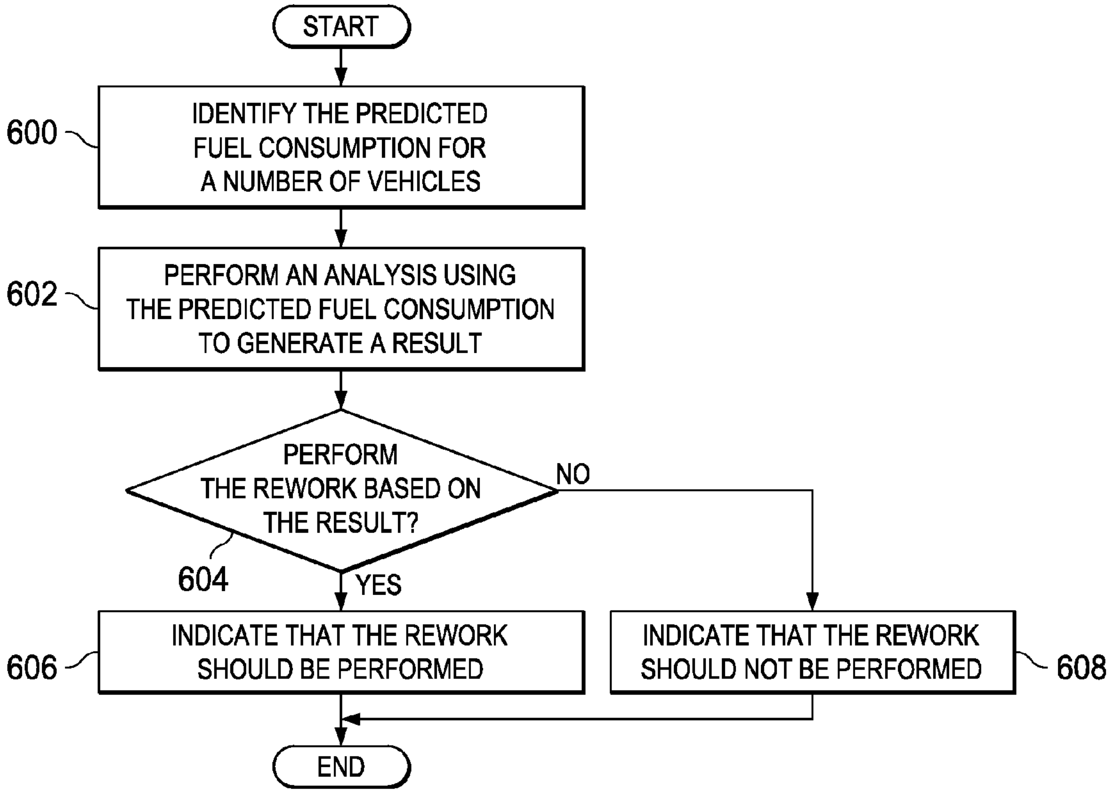
FIG. 6 is an illustration of a flowchart of a process for determining whether to rework the set of inconsistencies on the number of vehicles based on the predicted fuel consumption for the number of vehicles in accordance with an illustrative embodiment.

With reference now to FIG. 6, an illustration of a flowchart of a process for determining whether to rework the set of inconsistencies on the number of vehicles based on the predicted fuel consumption for the number of vehicles is depicted in accordance with an illustrative embodiment. The process illustrated in FIG. 6 may be implemented in fuel consumption manager 120 in fuel management environment 100 in FIG. 1. In particular, the process may be implemented in rework identifier 204 in FIG. 2. This process is also an example of one implementation for operation 304 in FIG. 3.

The process begins by identifying the predicted fuel consumption for a number of vehicles (operation 600). In the illustrative examples, the number of vehicles may be some or all of the vehicles in an organization. For example, if the organization is an airline, the number of vehicles may be some or all of the aircraft used or owned by the airline.

The process performs an analysis using the predicted fuel consumption to generate a result (operation 602). A determination is made as to whether to perform the rework based on the result (operation 604). If rework is to be performed on the number of vehicles, the process indicates that the rework should be performed (operation 606), with the process terminating thereafter. If rework is not to be performed, the process indicates that the rework should not be performed (operation 608), with the process terminating thereafter.

Figure 7:
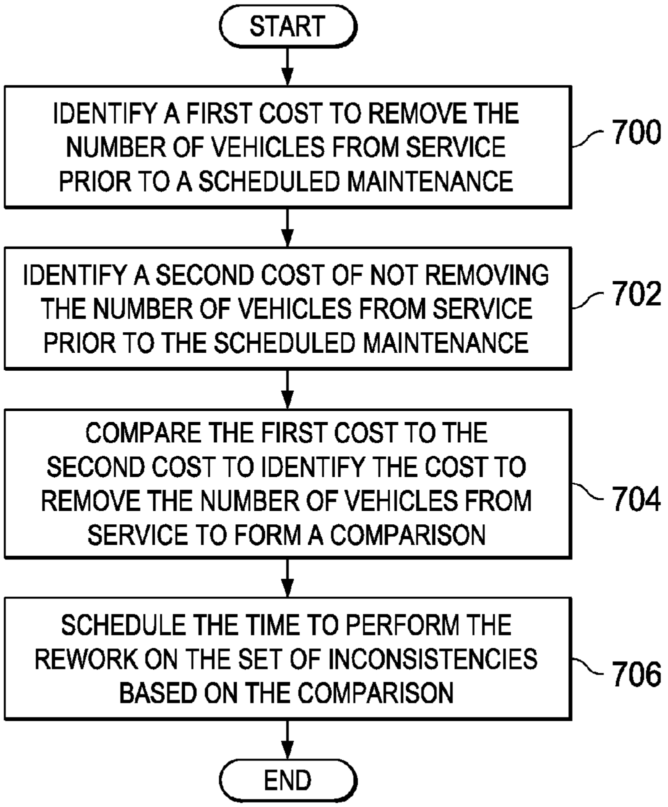
FIG. 7 is an illustration of a flowchart of a process for scheduling rework for a set of inconsistencies on the number of vehicles based on the predicted fuel consumption for the number of vehicles in accordance with an illustrative embodiment.

With reference now to FIG. 7, an illustration of a flowchart of a process for scheduling rework for a set of inconsistencies on the number of vehicles based on the predicted fuel consumption for the number of vehicles is depicted in accordance with an illustrative embodiment. The process illustrated in FIG. 7 may be implemented in fuel consumption manager 120 in fuel management environment 100 in FIG. 1. In particular, the process may be implemented in rework identifier 204 in fuel consumption manager 120. This process is also an example of one implementation for operation 306 in FIG. 3.

The process begins by identifying a first cost to remove the number of vehicles from service prior to a scheduled maintenance (operation 700). The process also identifies a second cost of not removing the number of vehicles from service prior to the scheduled maintenance (operation 702).

The first cost is compared to the second cost to identify the cost to remove the number of vehicles from service to form a comparison (operation 704). The process then schedules the time to perform the rework on the set of inconsistencies based on the comparison (operation 706), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 400 and operation 402 may be omitted. In this case, the second scan may be performed to both identify and obtain information for a set of inconsistencies on the vehicle. As another example, the scheduling of rework may be based on other factors other than the cost of removing a vehicle for rework prior to a scheduled maintenance. For example, availability of replacement vehicles may be considered in addition to and/or in place of the cost factors.

Figure 8:
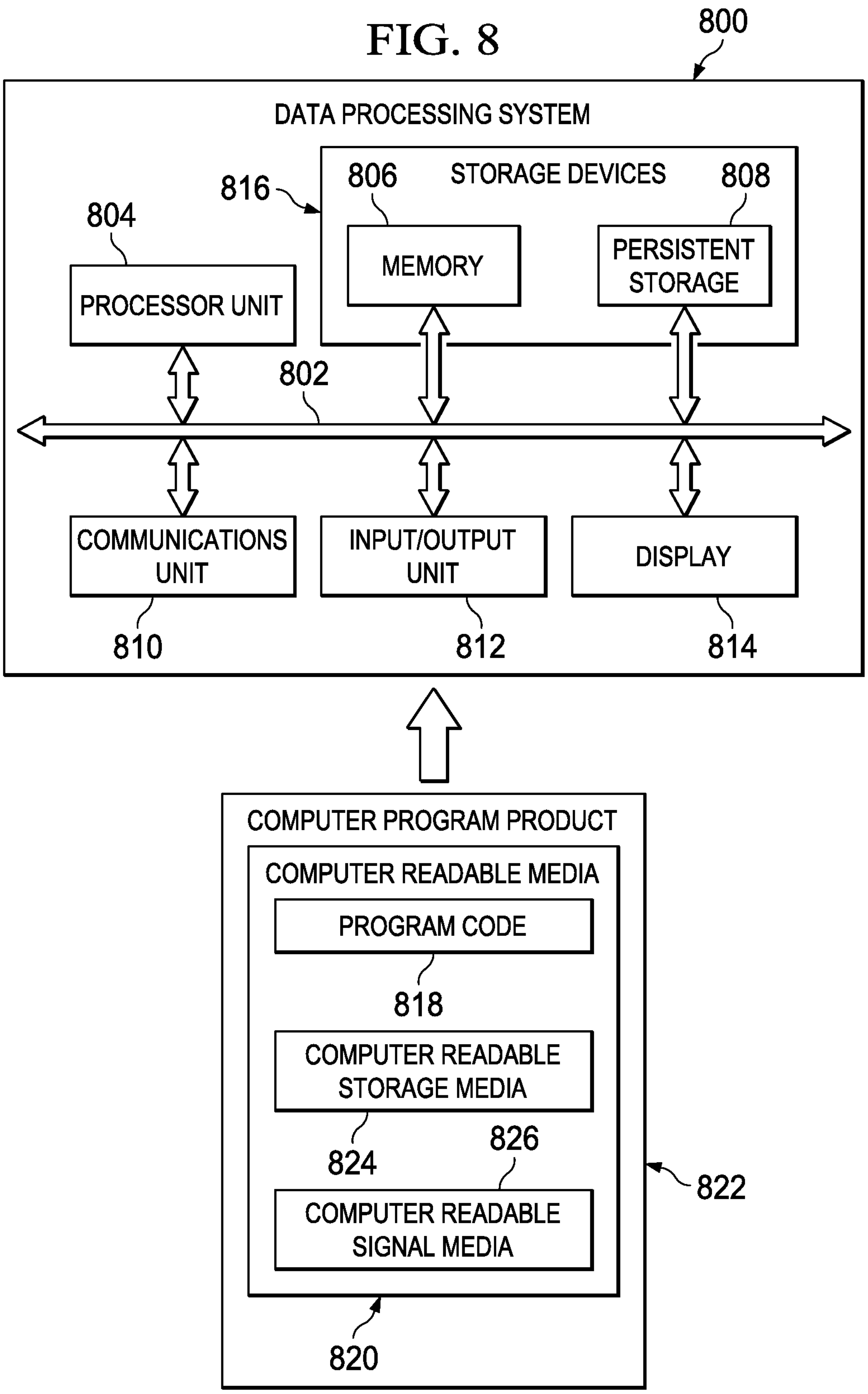
FIG. 8 is an illustration of a data processing system in accordance with an illustrative embodiment.

Turning now to FIG. 8, an illustration of a data processing system is depicted in accordance with an illustrative embodiment. Data processing system 800 may be used to implement computer system 124 in FIG. 1. In this illustrative example, data processing system 800 includes communications framework 802, which provides communications between processor unit 804, memory 806, persistent storage 808, communications unit 810, input/output (I/O) unit 812, and display 814. In these examples, communications framework 802 may be a bus system.

Processor unit 804 serves to execute instructions for software that may be loaded into memory 806. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications framework 802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 806, or a cache, such as found in an interface and memory controller hub that may be present in communications framework 802.

Thus, one or more of the illustrative embodiments provide a method and apparatus for managing fuel consumption for vehicles. One or more illustrative embodiments may be used to determine when rework should be performed on inconsistencies in a manner that decreases fuel consumption. Further, one or more illustrative embodiments takes into account the cost for vehicles with inconsistencies and may also take into account the cost for all vehicles in the organization. This cost may take into account the cost of fuel as well as other costs associated with performing the rework, removing the vehicles from use, and/or other suitable costs for the organization.

With fuel consumption management system 118 in FIG. 1, an organization, such as an airline, may be able to more easily identify fuel costs from predicted fuel consumption for aircraft. Costs for the overall fleet of aircraft may be taken into account when determining whether to rework inconsistencies for some aircraft in the fleet of aircraft.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of a computer system for managing fuel consumption for vehicles, the method comprising:

identifying a set of inconsistencies on a surface of a vehicle of a number of vehicles, wherein the set of inconsistencies has an effect on the fuel consumption by the number of vehicles;

identifying a predicted fuel consumption for the number of vehicles based on the set of inconsistencies; and determining whether to perform rework on the set of inconsistencies on the surface of the vehicle of the number of vehicles based on the predicted fuel consumption for the number of vehicles.

2. The method of claim 1 further comprising:
performing the rework on the set of inconsistencies in response to the predicted fuel consumption being greater than a desired fuel consumption for the number of vehicles.

3. The method of claim 1 further comprising:
scheduling a time to perform the rework on the set of inconsistencies in response to a determination to perform the rework on the set of inconsistencies.

4. The method of claim 3, wherein scheduling the time to perform the rework on the set of inconsistencies in response to the determination to perform the rework on the set of inconsistencies comprises:
identifying a first cost to remove the number of vehicles from service;
identifying a second cost of not removing the number of vehicles from service;
comparing the first cost to the second cost to identify a cost to remove the number of vehicles from service to form a comparison; and
scheduling the time to perform the rework on the set of inconsistencies based on the comparison.

5. The method of claim 1, wherein determining whether to perform the rework on the set of inconsistencies on the number of vehicles based on the predicted fuel consumption for the number of vehicles comprises:
determining whether to perform the rework on the set of inconsistencies on the number of vehicles based on at least one of the predicted fuel consumption for the number of vehicles and an overall fuel consumption predicted for the number of vehicles.

6. The method of claim 1, wherein identifying the predicted fuel consumption for the vehicles based on the set of inconsistencies comprises:
identifying a number of routes for the number of vehicles; and
identifying the predicted fuel consumption for the number of vehicles on the number of routes based on the set of inconsistencies.

7. The method of claim 6, wherein determining whether to perform the rework on the set of inconsistencies based on the predicted fuel consumption of the number of vehicles comprises:
determining whether to perform the rework on the set of inconsistencies based on a profitability of the number of routes for the number of vehicles using the predicted fuel consumption for the number of vehicles on the number of routes.

8. The method of claim 6, wherein identifying the predicted fuel consumption for the number of routes based on the set of inconsistencies comprises:
identifying a distance for a portion of a route in the number of routes for a selected vehicle in the number of vehicles; and
identifying a selected predicted fuel consumption for the portion using the set of inconsistencies and a predicted fuel consumption database for different distances.

9. The method of claim 1, wherein identifying the set of inconsistencies on the vehicles, wherein the set of inconsistencies has the effect on the fuel consumption by the vehicles further comprises:
performing an initial inspection of the vehicles for new inconsistencies; and
performing a second inspection to obtain information about the set of inconsistencies in response to an identification of a new inconsistency on the vehicles, wherein the information comprises a group of parameters for identifying the fuel consumption by the vehicles.

10. The method of claim 9, wherein the second inspection is performed using a sensor system.

11. The method of claim 1, wherein a vehicle in the number of vehicles is selected from one of an aircraft, a submarine, a spacecraft, a train, a truck, an automobile, a surface ship, and a ground vehicle.

12. A method of a computer system for analyzing fuel consumption for a group of vehicles, the method comprising:
identifying a set of inconsistencies on a surface of a vehicle of a number of vehicles in the group of vehicles, wherein the set of inconsistencies has an effect on the fuel consumption by the number of vehicles;
identifying a predicted fuel consumption for the number of vehicles based on the set of inconsistencies and a planned use of the number of vehicles; and
identifying a predicted cost associated with performing rework on the set of inconsistencies on the surface of the vehicle of the number of vehicles based on the predicted fuel consumption and the planned use for the number of vehicles.

13. A computer system for vehicle fuel consumption management comprising:
a vehicle model database; and
a fuel consumption manager configured to:
identify a set of inconsistencies on a surface of a vehicle of a number of vehicles in a plurality of vehicles, wherein the set of inconsistencies has an effect on a fuel consumption by a vehicle;
identify a predicted fuel consumption for the number of vehicles based on the set of inconsistencies using the set of inconsistencies identified and the vehicle model database; and
determine whether to perform rework on the set of inconsistencies on the surface of the vehicle of the number of vehicles based on the predicted fuel consumption of the vehicle.

14. The vehicle fuel consumption management system of claim 13 further comprising:
a sensor system in communication with the fuel consumption manager, wherein the sensor system is configured to generate information about the set of inconsistencies on the number of vehicles.

15. The vehicle fuel consumption management system of claim 14, wherein in being configured to identify the predicted fuel consumption for the number of vehicles based on the set of inconsistencies using the set of inconsistencies identified and the vehicle model database, the fuel consumption manager is configured to identify the predicted fuel consumption for the vehicle based on using the information about the set of inconsistencies generated by the sensor system and the vehicle model database.

16. The vehicle fuel consumption management system of claim 13, wherein in being configured to determine whether to perform the rework on the set of inconsistencies on the number of vehicles based on the predicted fuel consumption for the number of vehicles, the fuel consumption manager is configured to determine whether to perform the rework on the set of inconsistencies on the number of vehicles based on at least one of the predicted fuel consumption for the number of vehicles and an overall fuel consumption predicted for the number of vehicles.

17. The vehicle fuel consumption management system of claim 13, wherein the fuel consumption manager is configured to schedule a time to perform the rework on the set of inconsistencies in response to a determination to perform the rework on the set of inconsistencies.

18. The vehicle fuel consumption management system of claim 17, wherein in being configured to schedule the time to perform the rework on the set of inconsistencies in response to the determination to perform the rework on the set of inconsistencies, the fuel consumption manager is configured to identify a first cost to remove the number of vehicles from service; identify a second cost of not removing the number of vehicles from service; compare the first cost to the second cost to identify a cost to remove the number of vehicles from service to form a comparison; and scheduling the time to perform the rework on the set of inconsistencies based on the comparison.

19. The vehicle fuel consumption management system of claim 13, wherein in being configured to determine whether to perform the rework on the set of inconsistencies based on the predicted fuel consumption of the vehicle, the fuel consumption manager is configured to determine whether to perform the rework on the set of inconsistencies based on a profitability of a number of routes for the number of vehicles using the predicted fuel consumption for the number of vehicles on the number of routes.

20. The vehicle fuel consumption management system of claim 13, wherein the vehicle is selected from one of an aircraft, a submarine, a spacecraft, a train, a truck, an automobile, a surface ship, and a ground vehicle.

21. The method of claim 1, wherein the set of inconsistencies affects increases an amount of drag on the vehicle and reduces fuel efficiency of the vehicle.

22. The method of claim 1, wherein rework comprises cleaning the vehicle and other operations that increase the fuel efficiency of the vehicle.

* * * * *